United States Patent [19]

Beard

[11] Patent Number: 4,645,168

[45] Date of Patent: Feb. 24, 1987

[54] REINFORCED SUPPORT STRUCTURE FOR UPRIGHT HIGHWAY MARKER

[75] Inventor: James R. Beard, Harlingen, Tex.

[73] Assignee: Sea Hawk Corporation, Pflugerville, Tex.

[21] Appl. No.: 710,989

[22] Filed: Mar. 12, 1985

[51] Int. Cl.$^4$ ............................................. F16M 13/00
[52] U.S. Cl. .................................... 248/548; 248/523;
248/900; 403/199; 403/234; 403/262; 404/10
[58] Field of Search ............... 248/548, 900, 523, 524,
248/519; 404/10; 40/606, 607, 612; 52/98;
403/199, 187, 234, 236, 244, 245, 262, 263;
116/63 P

[56] References Cited

U.S. PATENT DOCUMENTS

| | | | |
|---|---|---|---|
| 3,729,157 | 4/1973 | Haff | 248/519 X |
| 3,872,906 | 3/1975 | Bolanz | 248/523 X |
| 4,364,688 | 12/1982 | Bitvai | 404/10 |
| 4,432,172 | 2/1984 | Kuykendall et al. | 404/10 X |

Primary Examiner—Ramon O. Ramirez
Attorney, Agent, or Firm—Jerry W. Mills; Gregory M. Howison

[57] ABSTRACT

A traffic marker support comprises a base (10) formed from polyvinyl chloride with a first angle iron section (16) and a second angle iron section (18) molded integral therewith. The lateral sides of the angle iron sections (16) and (18) form a channel (24) in the base (10). An upright marker (12) is disposed within the channel (24) and a bolt (30) used to secure the devices together. The lower surface (20) of the angle iron (18) and the lower surface (22) of the angle iron (16) are imbedded within the base (10) proximate the lower surface thereof with the channel (24) extending below the surface of the base (10) but not exposing the apexes of the angle iron sections (16) and (18). The reinforcement structure prevents rotational movement of the upright marker (12) with respect to the base (10) such that breakage at the uppermost portions of the angle iron sections (16) and (18) is prevented.

10 Claims, 10 Drawing Figures

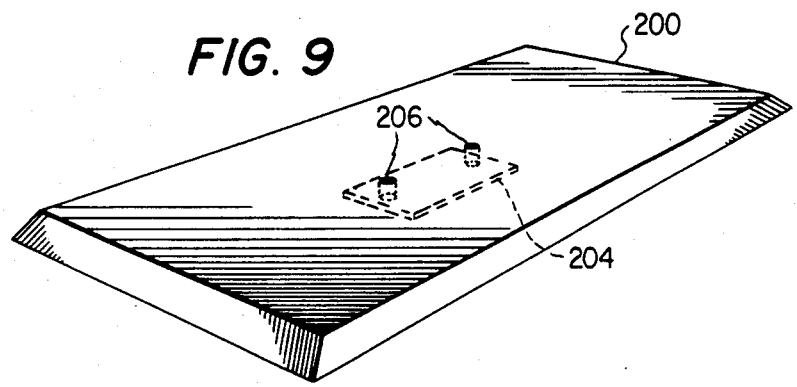
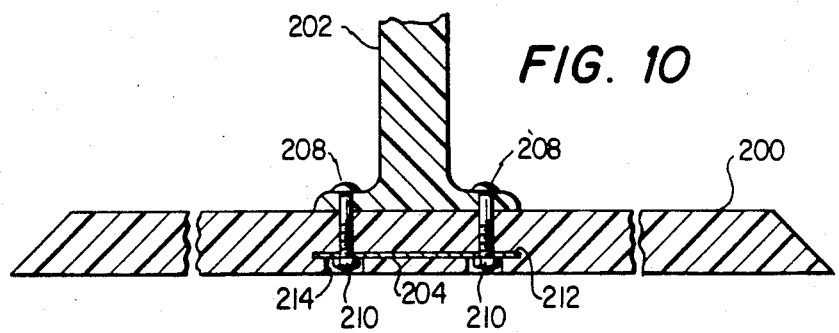

REINFORCED SUPPORT STRUCTURE FOR UPRIGHT HIGHWAY MARKER

TECHNICAL FIELD

The present invention pertains in general to highway markers and, more particularly, to the base plate on which upright markers are mounted for placement along the roadside.

BACKGROUND ART

Temporary highway markers are distributed along the roadside to alert drivers to various hazardous conditions such as ongoing construction, defective roadways, etc. These highway markers must be both portable and durable, while maintaining a relatively low cost. Since these markers are placed unattended in close proximity to moving traffic, they experience a high degree of theft or destruction by impact with an automobile or truck. This normally requires frequent replacement of the markers.

Heretofore, roadway markers have been fabricated from metal or wood forms which are placed on the side of the road and weighted down with a sandbag or similar device. Most states have regulations as to the type of material from which the upright portion of the road markers are fabricated and also the dimensions thereof. However, the base of the markers can be fabricated from any type of material. The only criteria for the base is that it provide sufficient weight to maintain the structure in an upright position to sustain high winds normally associated with passing vehicles and open spaces. However, there is no practical way to prevent these markers from being destroyed by impact with a vehicle as a result of an accident or even a voluntary act wherein a driver purposely runs into one of the markers. The result is usually total destruction of both the marker and the base, requiring replacement of both.

In view of the above disadvantages, there exists a need for a reinforced base onto which the upright structure can be placed that both provides sufficient weight to maintain the upright structure in position under normal operating conditions and also is capable of surviving vehicle impact with the marker structure.

SUMMARY OF THE INVENTION

The present invention disclosed and claimed herein comprises a reinforced structure for supporting an upright highway traffic marker. The reinforcing structure includes a base fabricated from a moldable material such as PVC and being semiresilient. A channel is formed in the base with a bottom surface and first and second sidewalls. The channel receives the lower end of the upright traffic marker for support thereof. A first reinforcing structure extends upward from the surface of the base and forms a portion of the first sidewall such that the first sidewall extends upward from the base. A second reinforcing structure extends upward from the surface of the base and forms the second sidewall of the channel such that the second sidewall extends upward from the base. The first and second reinforcing structures prevent rotational movement of the upright traffic structure with respect to the surface of the base. A bolt is disposed through the first and second reinforcing structures in orifices therein and through a cooperating orifice in the lower end of the upright traffic marker.

In another embodiment of the present invention, the first and second reinforcing structures each comprise an angle iron section with one surface thereof embedded in the molded material of the base. The other surfaces thereof extend perpendicular to the surface of the base and upward therefrom. The surfaces form the sidewalls of the channel. The channel extends downward from the upper surface of the base but does not expose the apexes of the two angle iron sections, such that lateral movement thereof is inhibited.

BRIEF DESCRIPTION OF THE DRAWINGS

For a more complete understanding of the present invention and the advantages thereof, reference is now made to the following description taken in conjunction with the accompanying Drawings in which:

FIG. 9 is a perspective view of an alternate embodiment of the support structure and upright marker; and FIG. 10 is a cross-sectional view of the embodiment of FIG. 9.

DETAILED DESCRIPTION

Figure 1:
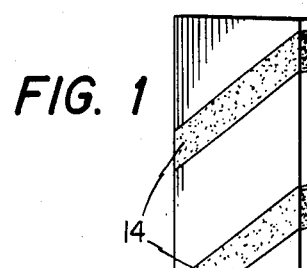
FIG. 1 illustrates a perspective view of the support structure with an upright marker in place.

Referring now to FIG. 1, there is illustrated a perspective view of a support platform or base 10 having an upright member 12 mounted thereon at right angles thereto. The upright member 12 is normally fabricated from such materials as wood with a height of approximately 36". The material and the height of the upright marker is normally specified by the various municipalities and can be other materials such as plastic, metal, etc. The upright member 12 has marking stripes 14 disposed thereon at an angle to the plane of the base 10. The stripes are indicative of the side on which the vehicles are to pass and can be oriented in either of two directions, indicating the left or right passage of vehicles. However, the upright member 12 could also have a message thereon.

Figure 2:
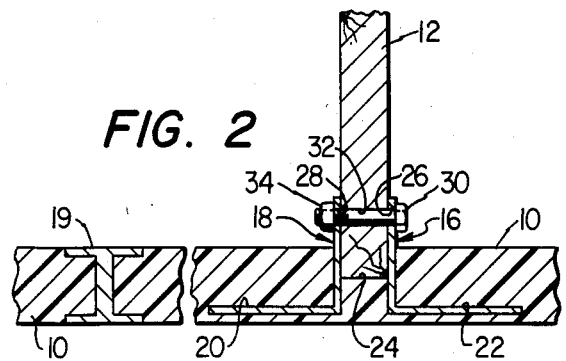
FIG. 2 illustrates a cross-sectional diagram of the support structure proximate the attachment point of the upright structure.

Referring now to FIG. 2, there is illustrated a cross-sectional view of a portion of the structure of FIG. 1, wherein like numerals refer to like parts in the two figures. The base 10 is fabricated from polyvinyl chloride (PVC), with two pieces of angle iron 16 and 18 molded integral therewith. Additionally, two inserts 19 and 21 are also molded integral with the base 10 proximate the ends thereof and can be fabricated from metal similar to the angle iron sections 16 and 18. However, the angle iron sections 16 and 18 and the inserts 19 and 21 can be fabricated from plastic or rubber.

The inserts 19 and 21 have a cross-sectional shape similar to an "I" beam with the lower surface coplanar with the lower surface of the base 10 and the upper surface coplanar with the upper surface of the base 10. The inserts 19 and 21 provide a surface to which an adhesive can be applied when attaching the base 10 to a road surface. Conventional adhesives do not readily adhere to PVC material.

During the molding process, a suitable primer is placed onto the sections of angle iron 16 and 18 which, in the preferred embodiment, are fabricated from eight inch segments of steel or angle iron. The primer allows the PVC to adhere during curing thereof. The sections of angle iron 16 and 18 are oriented such that one surface thereof is parallel to the plane of the base 10 and the other surface thereof is perpendicular to the plane of the base 10. The portion of the angle iron section 18 that is parallel to the base 10 is fully imbedded and is referred to as the fully imbedded portion 20. The portion of the angle iron section 16 that is parallel to the plane of the base 10 is referred to as the fully imbedded portion 22.

The fully imbedded portions 20 and 22 are proximate the lower surface of the base 10. Specifically, the imbedded portions 20 and 22 have the center lines thereof disposed such that approximately 30% of the thickness of the PVC material making up the base 10 is below the bottom surfaces thereof and 70% of the PVC material is above.

A channel 24 is formed between the perpendicular portions of the angle iron sections 16 and 18 and is dimensioned such that it is approximately ⅜ inch below the upper surface of the base 10. The portion of the perpendicular sections 16 and 18 that extends above the upper surface of the base 10 is approximately 1.25 inches. Therefore, the surfaces of the angle iron sections 16 and 18 facing inward toward the channel 24 present a surface area perpendicular to the base 10 that is approximately 1⅞ inches by 8 inches with the width of the channel 24 being approximately 1.5 inches.

An orifice 26 is disposed in the angle iron section 16 and an orifice 28 is disposed in the angle iron section 18. Both orifices 26 and 28 are disposed above the surface of the base 10. A bolt 30 is disposed through the two orifices 26 and 28 and through a corresponding orifice 32 in the upright member 12. A nut 34 is disposed on the other end of the bolt 30. The bolt 30 is operable to hold the upright member 12 in an upright position.

In operation, the base 10 provides a sufficient amount of weight to maintain the upright member 12 in an upright position. Since the upright member 12 is approximately 36 inches by 8 inches, a surface area of 75 square inches is provided which must be compensated for, depending upon the wind load factors that will be incurred. The base 10, in the preferred embodiment, is approximately 14 inches wide, 22 inches long and 1¼ inches thick. This provides a weight of approximately 15 pounds. The upright member 12 is placed into the channel 24 and the bolt 30 mounted through the orifice 32 therein. Under normal conditions, the base 10 and upright member 12 are maintained in an upright position on the side of the road. However, if a vehicle strikes the upright member 12, the reinforcing angle iron sections 16 and 18 provide a reinforcement point at the upper end thereof. At this point, a large rotational moment will be experienced by the upright member 12 causing it to pivot and break at that point. At the same time, the imbedded portions 20 and 22 also experience the same type of rotational moment with this moment being opposed by the weight of the base 10.

For example, if a vehicle impacts the upright member 12 from the side of the base 10 in which the imbedded portion 22 is disposed, the upright member 12 will rotate toward the upright portion of the angle iron section 18. This rotational movement will be opposed by the upright portion of the angle iron section 16. This will be a counterclockwise rotation of the upright member 12 in FIG. 2.

A counterclockwise rotation of the upright member 12 will also result in a counterclockwise rotation of both of the angle iron sections 16 and 18. However, the base 10 cooperates with the imbedded portions 20 and 22 to impart a relative clockwise rotation to the angle iron sections 16 and 18. This results in a downward force on the upper surface of the imbedded portion 22 and an upward force on the lower surface of the imbedded portion 20, these forces translated through the PVC material of the base 10. The overall result is that the upright member 12 will break at the juncture thereof with the angle iron sections 16 and 18. The clockwise rotation imparted to the angle iron sections 16 and 18 by the base 10 is aided by the fact that a moving vehicle may normally have the tire disposed on the surface thereof. However, if the device does not break, it is merely laid on its side. If the upright member 12 is damaged, it merely has to be replaced with another and disposed at the proper location.

Figure 3:
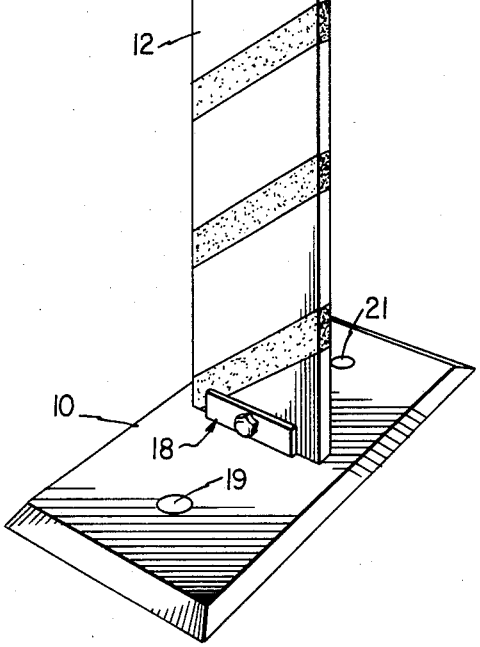
FIG. 3 illustrates an alternate embodiment of the support structure with a spacer utilized for a thinner upright section.
Figure 3:
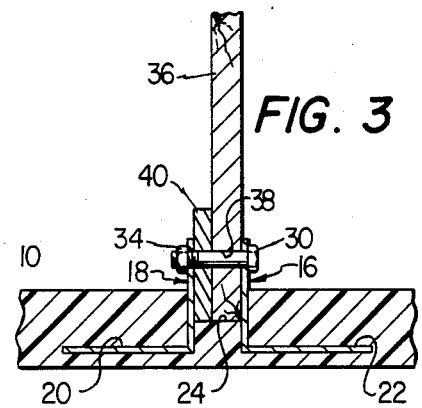

Referring now to FIG. 3, there is illustrated an alternate embodiment of the marker of FIGS. 1 and 2, wherein like numerals refer to like parts in various figures. In the embodiment of FIG. 3, an upright member 36 having a thickness less than that of the upright member 12 and of the channel 24 is disposed in the channel 24. An orifice 38 is disposed in the upright member 36 such that bolt 30 can pass therethrough to threadedly engage with the nut 34. To prevent movement of the thinner upright structure 36 within the channel 24, a metal spacer 40 fills up the gap between the structure 36 formed in the channel 24. By utilizing the spacer 40, different types of material and different thicknesses of those materials can be utilized, thus making the support structure of the present invention more versatile.

Figure 4:
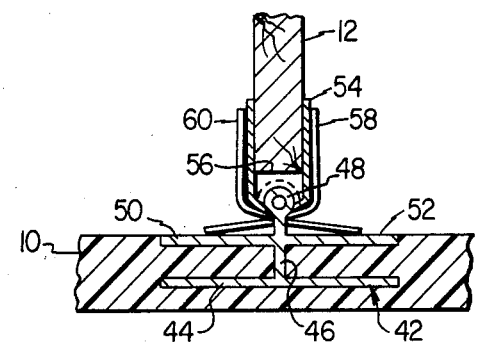
FIG. 4 illustrates an alternate embodiment of the support structure with a hinge mechanism.

Referring now to FIG. 4, there is illustrated an alternate embodiment of the structure, wherein like numerals refer to like parts in the various figures. The base 10 has molded integral therewith an extruded metal member 42 which has a "T" shape with a broad lower surface 44 which is parallel to the plane of the base 10 and is imbedded in the lower portion of the base 10, similar to the imbedded portions 20 and 22 of FIG. 2. An upright portion 46 extends from the planar portion 44 upward and above the surface of the base 10 and having a hinge 48 attached thereto. Two wing members 50 and 52 extend on either side of the upright portion 46 proximate the upper surface of the base 10. A pivoting bracket 54 is mounted on the hinge 48 and rotational about the rotational axis thereof. The pivoting bracket 54 has a channel 56 formed therein for receiving the lower end of the upright member 12. The pivoting member 54 is operable to pivot freely about the hinge 48 to a point parallel with the base 10 on either side of the hinge 48.

A foldover hinge 58 is disposed about the hinge 48 with an upright member disposed proximate one side of the pivoting bracket 54 and a lower portion disposed proximate the wing portion 50 of the reinforced structure 42. The foldover hinge 58 presents a restriction to counterclockwise rotation in the illustrated section of FIG. 4. A foldover hinge 60 is disposed about the hinge 48 with an upright portion on the opposite side of the pivoting member 54 from the hinge 58 and a lower portion disposed proximate the wing portion 52. The foldover hinge 60 resists clockwise rotation in the section of FIG. 4. The hinges 58 and 60 and the pivoting action of the pivoting bracket 54 allow the upright member 12 to pivot with respect to the upper surface of the base 10 when impacted. This will minimize the actual breakage of the devices upon impact. The strength of the hinges 58 and 60 is such that normal wind loads will not cause significant flexing thereof but still allows adequate response of the pivoting action in response to an impact. However, some impacts are so severe that breakage will still occur at the upper portion of the pivoting bracket 54. In this mode, the strength of the imbedded structure 42, hinge 48 and pivoting member 54 is such that it will sustain these impacts.

Figure 5:
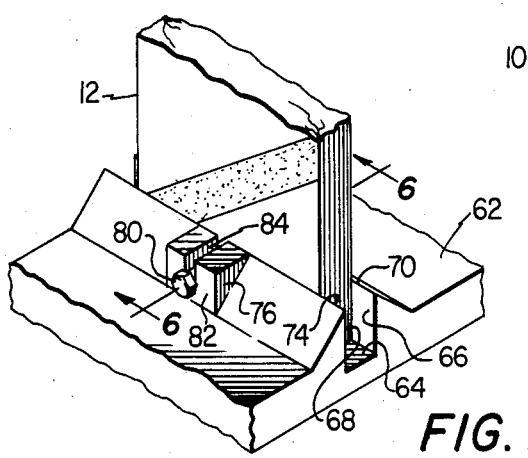
FIG. 5 illustrates a perspective view of an alternate embodiment of the support structure without the upright structure in place.

Referring now to FIG. 5, there is illustrated yet another embodiment of the present invention which includes a base 62 fabricated from PVC material such as base 10. However, the base 62 has a support member molded therein by forming a channel 64 which, in cross section, is similar to the channel 24, except that the channel 64 has sidewalls 66 and 68 molded therein. The sidewall 66 is part of a molded portion 70 and the sidewall 68 is a part of a molded portion 74, with both extending upward from the surface of the base 62. The molded portions 70 and 74 have a triangular cross-sectional shape with the sidewalls 66 and 68, respectively, extending at an angle perpendicular to the base 62. The outer surfaces of the portions 70 and 74 taper downwardly and away from the channel 64 to intersect with the upper surface of the base 62. Therefore, the molded portions 70 and 74 provide reinforcement for the sidewalls 66 and 68 such that rotation of the upright member 12, when disposed in the channel 64, is opposed by the sidewalls 66 and 68 and reinforced by the tapered walls of the molded portions 70 and 74. A protrusion 76 is formed in the center of the molded portion 74 and a protrusion 78 is formed in the molded portion 70. A bolt 80 with a nut attached on the other end thereof is disposed through an orifice in the protrusions 76 and 78 to maintain the upright member 12 in the channel 64.

The protrusion 76 has a vertical wall 82 which extends upward from the plane of the base 62 at the intersection point of the tapered wall of the molded portion 74 with the upper surface of the base 62. The upper surface of the protrusion 76 is coplanar with the upper surface of the base 62. A slot 84 is formed in the protrusion 76 and axially aligned with the bolt 80. The slot extends downward from the upper surface of the protrusion 76 to the bolt 80 such that the portion of the protrusion 76 above the bolt 80 is divided into a right and left half. As will be described hereinbelow, the bolt 80 can be pulled upward through the slot 84, provided that a sufficient amount of force is applied to widen the slot 84. The slot 84 is significantly narrower than the width of the bolt 80.

Figure 6:
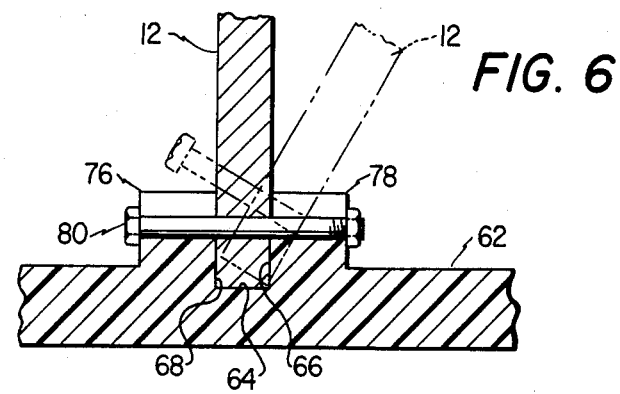
FIG. 6 illustrates a cross-sectional diagram of the support structure of FIG. 5.

Referring now to FIG. 6, there is illustrated a cross-sectional view taken along lines 6—6 in FIG. 5, wherein like numerals refer to like parts in the two figures. The upright member 12 is disposed in the channel 64 with the bolt 80 holding the support member 12 in place. As shown by dotted lines, a force applied to the surface of the upright member 12 causes the member 12 to rotate with respect to the plane of the base 62, thus causing one side of the bolt 80 to move upward. The slot 84 acts as a strain relief and allows the bolt 80 to move upward with respect to the base 62. This prevents tearing of the protrusion 76 with the result that the bolt bends and releases the upright member 12. With the use of the slot and resilient material for the base 62, a relatively rigid device can be provided for normal operating conditions which will allow the upright member to be released from the support structure when impacted by a moving vehicle or some other such object.

Figure 7:
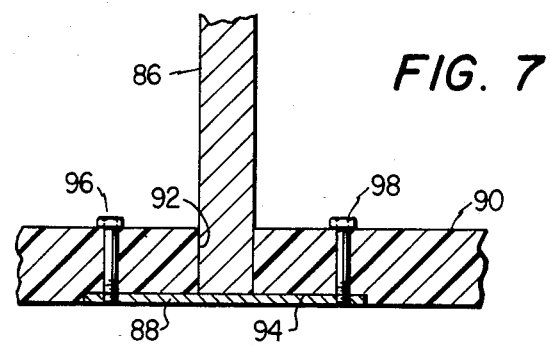
FIG. 7 illustrates an alternate embodiment of the support structure.

Referring now to FIG. 7, there is illustrated yet another embodiment of the present invention. An upright support member 86, similar to the upright support member 12, is mounted on a base plate 88 at a perpendicular angle thereto. A base 90, similar to the base 10, has a rectangular slot 92 formed therein. Additionally, a recess 94 is provided in the bottom surface of the base 90 for receiving the base plate 88. To assemble the apparatus of FIG. 7, the base 90 is passed over the top of the upright support member 86 and lowered down on the base plate 88. A bolt 96 and a bolt 98 are passed through the upper surface of the base 90 and into the base plate 88 to provide adherence thereto.

Figure 8:
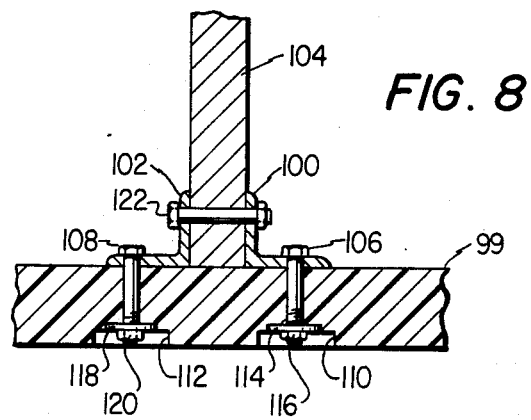
FIG. 8 illustrates an alternate embodiment of the support structure.

Referring now to FIG. 8, there is illustrated a yet further embodiment of the present invention. A base 99, fabricated similar to the base 10, is provided for a planar support member. A first section of angle iron 100 and a second section of angle iron 102 are mounted on the upper surface of the base 99 and disposed a distance apart. An upright support member 104, similar to the support member 12, is mounted between the two angle iron sections 100 and 102. The angle iron sections 100 and 102 are mounted onto the base 99 with the use of bolts 106 and 108, respectively. The bolt 106 extends downward into the base 99 to a recess 110 on the lower surface of the base 99. In a similar manner, the bolt 108 extends downward to a recess 112 on the lower surface of the base 99. The bolt 106 has a washer 114 and a bolt 116 attached to the other end thereof in the recess 110. The bolt 108 has a washer 118 and a bolt 120 attached to the other end thereof in the recess 112. The recesses 110 and 112 provide an area for the securing bolts and the washers to reside without providing an obstruction or an uneven surface on the bottom surface of the base 99. The upright member 104 is secured to the angle iron sections 100 and 102 with a bolt 122.

Referring now to FIGS. 9 and 10, there is illustrated another embodiment of the present invention. A base 200, similar to base 10, has a base plate 204 molded therein near the bottom surface of the base 200. Vertical holes 206 pass through base 200 and base plate 204.

A pedestal 202 is mounted to base 200 by bolts 208 passing through pedestal 202 and holes 206. Nuts 210, threaded onto bolts 208 in recesses 212 and 214 of base 200, hold pedestal 202 and base 200 together. By using bolts 208 of proper size, recesses 212 and 214 ensure that no structure extends through the flat bottom surface of base 200. Pedestal 202 can comprise an upright member such as member 12, or be a base for such a member.

In summary, there has been provided a reinforcing structure which comprises a channel formed in a PVC base plate with reinforcing structures formed on the sides of the channel. In the preferred embodiment, these reinforcing structures are angle iron sections that are imbedded within the PVC base and extending above the upper surface thereof. They are oriented such that they form the sidewalls of the channel to receive the lower end of the upright section therebetween. A bolt is disposed through the upright portions of the angle iron sections and through the lower end of the upright member to retain the upright member in the channel.

Although the preferred embodiment has been described in detail, it should be understood that various changes, substitutions and alterations can be made therein without departing from the spirit and scope of the invention as defined by the appended claims.

I claim:

1. A reinforcing structure for supporting an upright traffic highway marker having an upper end and a lower end and parallel surfaces, comprising:

a base fabricated from a moldable material, said base being in a plane and having upper and lower surfaces, said base being semi-resilient;

a channel formed in said base and having a bottom surface and first and second sidewalls for receiving the lower end of the upright traffic marker with said first and second sidewalls perpendicular to the plane of said base and parallel to the surfaces of the upright traffic marker;

a first reinforcing structure extending upwards from the surface of said base and forming a portion of said first sidewall such that said first sidewall extends upward from said base;

a second reinforcing structure extending upwards from the surface of said base and forming a portion of said second sidewall such that said second sidewall extends upward from said base; and securing means for securing said upright traffic marker in said channel and preventing upward and outward movement thereof;

said first and second reinforcing structures providing a reinforcement point that prevents rotational motion of the upright traffic marker about said base, said first and second reinforcing structures having a strength sufficient to cause the upright traffic marker to break or bend at the uppermost portions of said first and second reinforcing structures at the point at which uppermost portions of said first and second reinforcing structures contact the upright traffic marker such that damage of said base is prevented.

2. The apparatus of claim 1 wherein the bottom surface of said channel is disposed below the upper surface of said base.

3. The apparatus of claim 1 wherein said first and second reinforcing structures comprise a section of angle iron having a first surface and a second surface, said first surface disposed perpendicular to said second surface, said first surface disposed integral with said base and proximate the lower surface thereof, said second surface extending upward above the upper surface of said base and perpendicular thereto, said second surface coplanar with the respective one of said first and second sidewalls such that they are coplanar therewith.

4. The apparatus of claim 1 wherein said securing means comprises a bolt disposed through an orifice in said first and second reinforcing structures and a cooperating orifice in the upright traffic marker.

5. The apparatus of claim 1 wherein said base is fabricated from polyvinyl chloride material.

6. The apparatus of claim 1 wherein the width of said channel is wider than the upright traffic marker and further comprising a spacer for disposal in said channel between the upright traffic marker and one of said first and second sidewalls such that lateral movement of the upright traffic marker in said channel is minimized.

7. The apparatus of claim 1 and further comprising an insert integrally molded with said base and fabricated from a material compatible with conventional adhesives, said insert being coplanar with the lower surface of said base and exposed such that adhesive placed on a road surface can adhere thereto.

8. A reinforcing structure for supporting an upright traffic highway marker, comprising:

a base fabricated from a moldable material and having parallel upper and lower surfaces, said base being semi-resilient;

a first section of angel iron having a length approximately equal to the width of the upright traffic marker and having first and second longitudinal surfaces, said first longitudinal surface disposed perpendicular to said second longitudinal surface, said first section of angle iron having the first longitudinal surface thereof imbedded within said base during molding thereof and coplanar with the upper surface of said base, the second longitudinal surface of said first angle iron extending upwards above the upper surface of said base and perpendicular thereto;

a second section of angle iron having a length equal to said first section of angle iron and having first and second longitudinal sides, the first longitudinal side thereof perpendicular to the second longitudinal side thereof, the first longitudinal side imbedded in said base and coplanar with the first section of said first angle iron section and oriented away from the second section of said first angle iron section, the second surface of said second angle iron section extending upward from the upper surface of said base and parallel to the first section of said first angle iron section to form a channel therebetween having first and second sidewalls and a lower surface;

said channel for receiving the lower end of the upright traffic marker;

said first and second angle iron sections each having an orifice disposed in the second sections thereof above said base, each of the orifices disposed along a common center axis; and a bolt disposed through the orifices in said first and second angle iron sections and cooperating with a corresponding orifice in the upright traffic marker such that movement of the upright traffic marker outward from said channel is inhibited.

9. The apparatus of claim 8 wherein the first longitudinal surfaces of said first and second angle iron sections are disposed within said base proximate the lower surface thereof such that approximately 70% of the thickness of said base is above and 30% below.

10. The apparatus of claim 8 wherein the lower surface of said channel is disposed below the upper surface of said base but does not extend proximate or below the juncture of the first and second longitudinal surfaces of each of said first and second angle iron sections.

* * * * *